United States Patent [19]
Farris

[11] Patent Number: 5,111,715
[45] Date of Patent: May 12, 1992

[54] WINDOW MOTOR ATTACHMENT TO VEHICLE DOOR

[75] Inventor: Timothy M. Farris, Sterling Heights, Mich.

[73] Assignee: General Motors Corporation, Detroit, Mich.

[21] Appl. No.: 725,724

[22] Filed: Jul. 3, 1991

[51] Int. Cl.⁵ .............................................. F16H 57/02
[52] U.S. Cl. ...................................... 74/606 R; 310/83
[58] Field of Search ................ 74/606 R; 310/83, 89, 310/91

[56] References Cited

U.S. PATENT DOCUMENTS

| | | | |
|---|---|---|---|
| 4,517,880 | 5/1985 | Buckner et al. | 98/248 |
| 4,531,700 | 7/1985 | Robinson | 248/672 |
| 4,625,134 | 11/1986 | Weaver | 310/83 |
| 4,939,867 | 7/1990 | Harada et al. | 49/349 |

Primary Examiner—Dirk Wright
Attorney, Agent, or Firm—Charles E. Leahy

[57] ABSTRACT

A vehicle door has a window regulator carried by a panel and a motor drive unit with a drive gear projecting from an opening in a housing and adapted to drive the window regulator. A cover is provided for attachement on the housing to close the opening. The cover has a plurality of spaced apart first tangs which engage the housing to effect attachment of the cover on the housing. The cover also has a plurality of spaced apart second tangs which project away from the housing. A plurality of openings are provided in the panel to register with the plurality of second tangs and receive the second tangs in snap fitting engagement with the openings so that the motor drive unit is attached to the door panel. The first tangs may be attached to the housing by either staking the housing to the tangs or by the tangs having a snap fitting engagement with the housing. The second tangs are stamped integrally with the cover and include a retorsely bent leg adapted to yieldably engage the opening in the panel and carrying a lock tab which engages with the the face of the panel to assure the attachment of the motor unit on the door panel against removal therefrom.

5 Claims, 3 Drawing Sheets

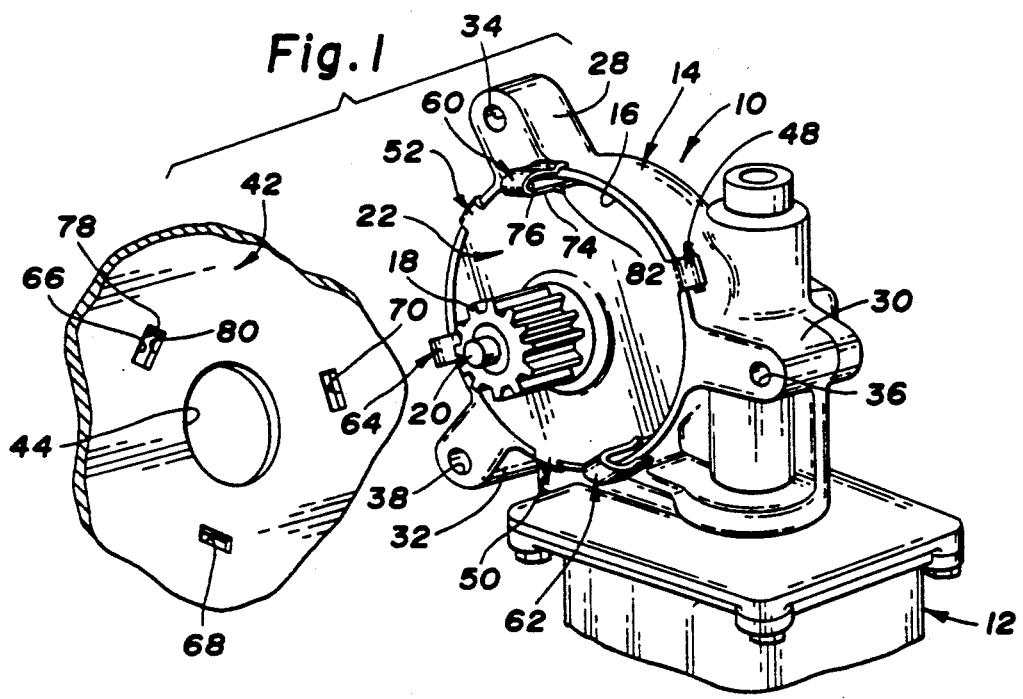
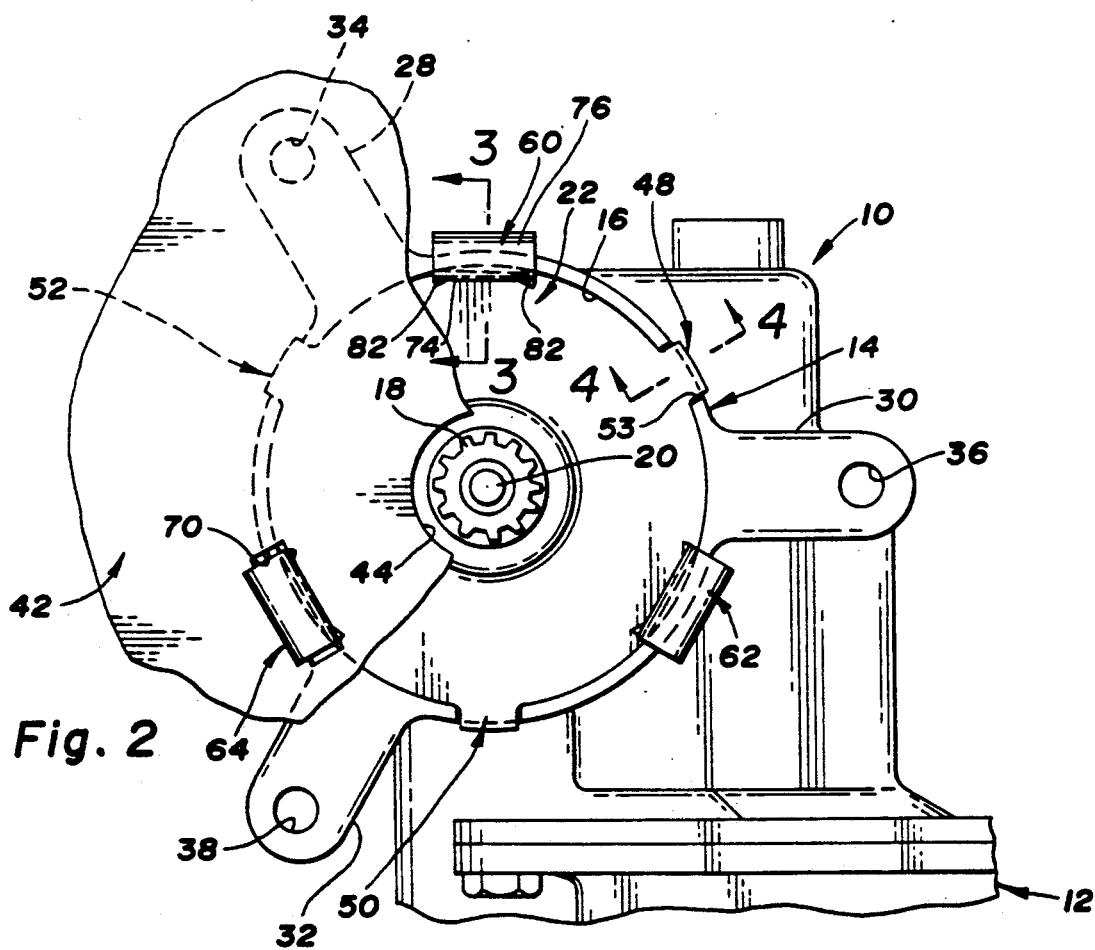

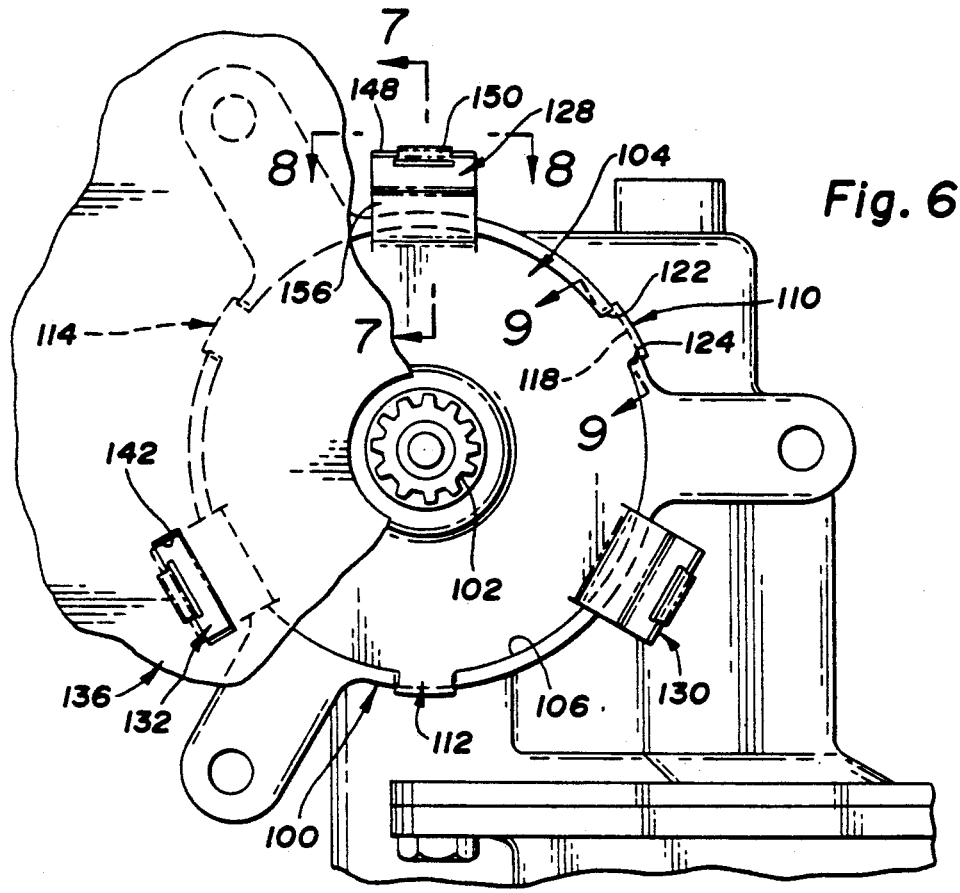
Fig. 6
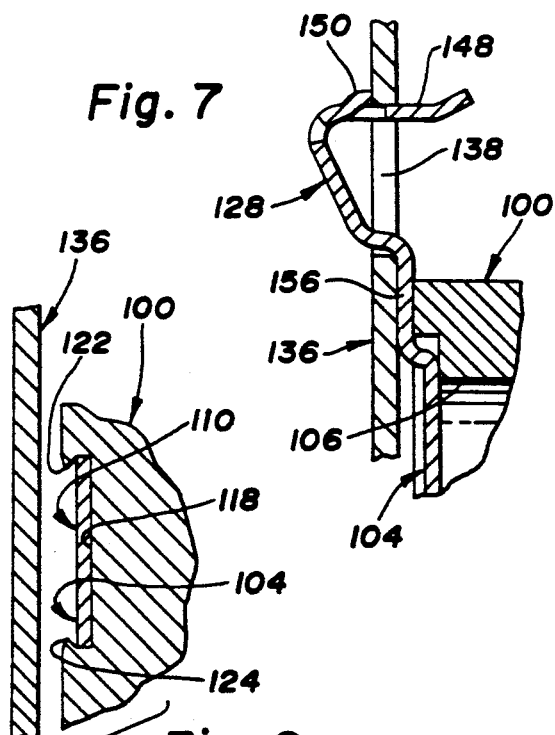
Fig. 7
Fig. 9
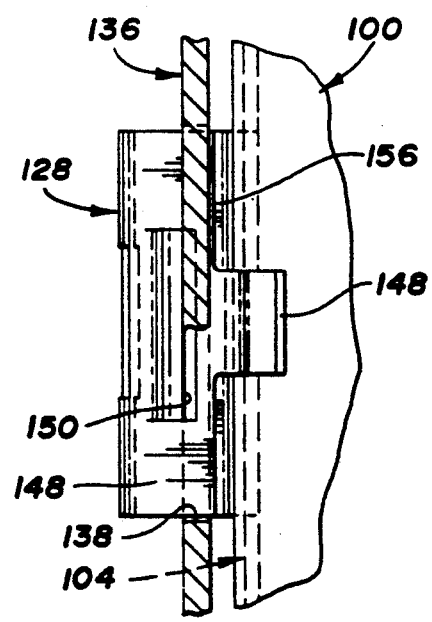
Fig. 8

WINDOW MOTOR ATTACHMENT TO VEHICLE DOOR

The invention relates to a motor vehicle window regulator motor and more particularly provides an improved cover for the motor drive housing by which the motor drive unit may be attached to the vehicle door without fasteners.

BACKGROUND OF THE INVENTION

It is well known in motor vehicles to raise and lower windows via an electric motor which operates the window regulator. The window regulator and the motor are mounted on the door panel or on a module panel. The motor drive unit is comprised of a die cast housing which carries the electric motor and encloses a gear reduction set. A pinion gear projects out of the housing and is adapted to mesh with the window regulator. A dust cover is suitably attached to the die cast housing, as by staking, to close the opening from which the pinion gear projects and thereby prevent the entry of dirt, water or other foreign matter.

In the prior art, the die cast housing for the drive unit is conventionally provided with a plurality of lugs having bolt apertures therethrough. These bolt apertures register with holes provided in the panel and fasteners such as rivets, screws, or bolts are inserted through these aligned apertures to attach the motor unit on the panel.

It would be desirable to eliminate the need for the installation of labor intensive fasteners to mount the motor drive unit on the panel.

SUMMARY OF THE INVENTION

According to the invention, a vehicle door has a window regulator carried by a panel and a motor drive unit with a drive gear projecting from an opening in a housing and adapted to drive the window regulator. A cover is provided for attachment on the housing to close the opening. The cover has a plurality of spaced apart first tangs which engage the housing to effect attachment of the cover on the housing. The cover also has a plurality of spaced apart second tangs which project away from the housing. A plurality of openings are provided in the panel to register with the plurality of second tangs and receive the second tangs in snap fitting engagement with the openings so that the motor drive unit is attached to the door panel. The first tangs may be attached to the housing by either staking the housing to the tangs or by the tangs having a snap fitting engagement with the housing. The second tangs are stamped integrally with the cover and include a retorsely bent leg adapted to yieldably engage the opening in the panel and carrying a lock tab which engages with the the face of the panel to assure the attachment of the motor unit on the door panel against removal therefrom.

Thus, the object, feature, and advantage of the invention resides in the provision of a cover plate for a motor drive unit and having a first tang adapted for attachment to the motor drive unit housing and second tangs adapted for snap fitting engagement with registering apertures provided in the door panels in order to accomplish attachment of the motor drive unit on the vehicle door without the labor intensive installation of a plurality of independent fastening devices.

BRIEF DESCRIPTION OF THE DRAWINGS

These in other features, objects, and advantages of the invention will be understood upon consideration of the description of the preferred embodiment and the appended drawings in which:

FIG. 1 is a perspective view of the motor drive unit and door panel of the present invention shown in exploded relationship;

FIG. 2 is a elevation view showing the motor drive unit attached to the door panel and having the door panel broken away;

FIG. 6 is a view similar to FIG. 2 but showing the second embodiment of the invention;

FIG. 7 is a sectional view taken in the direction of arrows 7—7 of FIG. 6;

FIG. 8 is an end view of a locking tab taken in the direction of arrows 8—8 of FIG. 6; and FIG. 9 is a sectional view taken in the direction of arrows 9—9 of FIG. 6.

DESCRIPTION OF THE PREFERRED EMBODIMENT

Figure 4:
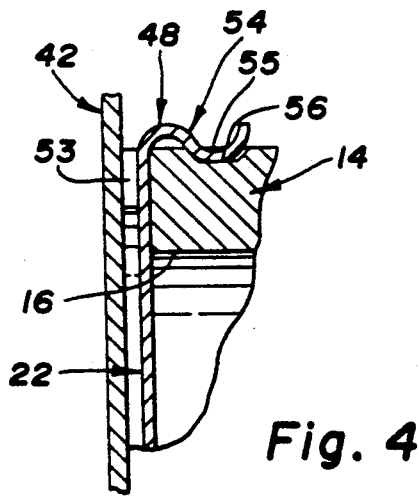
FIG. 4 is a sectional view taken in the direction of arrows 4—4 of FIG. 2.

Referring to FIG. 1 it is seen that a motor drive unit generally indicated at 10 is provided for operating a window regulator, not shown. The motor drive unit 10 includes a motor housing 12 which encloses an electric motor and a gear housing 14 which encloses a reduction gear set. The gear housing 14 has an opening 16 therein from which a pinion gear 18 projects and is mounted on a drive shaft 20. A annular shaped cover 22 is provided for attachment to the gear housing 14 to enclose and conceal the reduction gear set located inside the gear housing 14.

The gear housing 14 is of die cast construction and includes three integral mounting lugs 28, 30 and 32. The lugs 28, 30, and 32 respectively have fastener holes, 34, 36 and 38 extending therethrough.

The motor drive unit 10 is to be mounted on a door panel 42 which has a hole 44 through which the gear 18 will extend to mesh with the window regulator mechanism, not shown. In the prior art, a plurality of holes are provided in the panel 42 which will register with the fastener holes 34, 36, and 38 of the gear housing 14. The motor drive unit 10 is then attached to the panel 42 by inserting fasteners such as bolts, screws or rivets through the aligned fastener holes.

The present invention provides snap-together attachment of the motor drive unit 10 onto the door panel 42 without the use of separate fasteners. As best seen in FIGS. 1 through 4, the cover 22 is of sheet metal stamped construction and includes a plurality of tangs 48, 50, and 52 which project radially outward from the cover 22. As shown in FIG. 4, the tang 48 reaches outwardly through a recess 53 provided in gear housing 14 and the end of the tang 48 is bent to define a spring arm 54 having a dimple 55 which seats in a recess 56 in the gear housing 14. As best seen in FIG. 2, the tang 48 is closely captured within the walls defining the recess 53 so that the cover is effectively anchored against rotation relative to the gear housing 14. The tangs 50 and 52 are constructed like the tang 48 and are located circumferentially spaced about the cover 22 and cooperate to securely attach the cover 22 to the gear housing 14.

Figure 3:
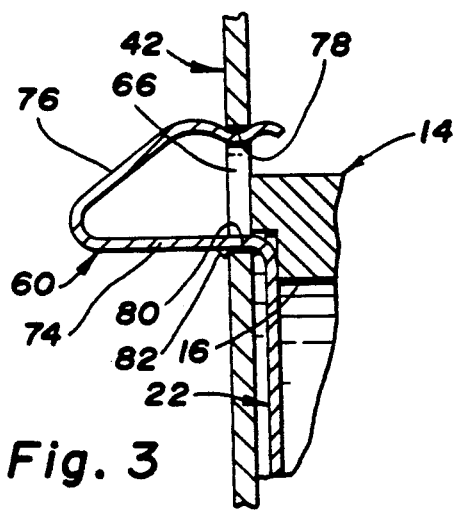
FIG. 3 is a sectional view taken in the direction of arrows 3—3 of FIG. 2.

As best seen in FIGS. 2 and 3, the cover 22 also has a plurality of mounting tangs 60, 62 and 64 which are adapted for installation through a plurality of rectangular openings 66, 68, and 70 provided in the door panel 42. As best seen in FIG. 3, the tang 60 includes a mounting arm 74 which is integral with the cover 22 and projects at right angles therefrom away from the housing 14. The mounting arm 74 is retorsely bent to define a spring arm 76 which reaches back toward the housing 14. As seen in FIG. 3, the alignment of the cover tang 60 with the rectangular aperture 66, followed by the insertion of the tang 60 through the aperture 66 causes the spring arm 76 to resiliently engage against the outer wall 78 of the aperture 66 and thereby maintain the mounting arm 74 in engagement against an inner wall 80 of the aperture 66. As best seen in FIG. 3, the mounting arm 74 carries lock tabs 82 which passes through the aperture 66 and engages with the panel 42 to lock the tang 60 against removal from the aperture 66 of the panel 42. It will be appreciated that the tangs 62 and 64 are constructed the same as the tang 60 so that the plurality of tangs 60, 62, and 64 cooperate to anchor the housing 14 on the panel 42 against rotation and against axial movement.

As seen in FIG. 3, the completed insertion of the tang 60 through the aperture 66 causes the housing 14 to be established in engagement against the panel 42 and the lock tang 82 to be engaged with the panel 42 to thereby prevent the housing 14 from axial movement relative the panel 42.

DESCRIPTION OF THE SECOND EMBODIMENT

FIGS. 5 through 9 show a second embodiment of the invention. In the second embodiment, the gear housing 100 has a pinion gear 102 projecting therefrom and an annular cover 104 closing an opening 106 in the housing 100. Cover 104 has a plurality of tangs 110, 112, and 114 which project radially therefrom. As seen in FIGS. 6 and 9, tang 110 seats within a recess 118 of the housing 100 and the housing is staked over the tang 110 at 122 and 124 so that the tang 110 is permanently affixed to the housing 100.

The cover 104 also has a plurality of tangs 128, 130 and 132 best seen in FIGS. 6, 7, and 8. The tang 128 is integral with the cover 104 and projects away from the housing 100.

Figure 5:
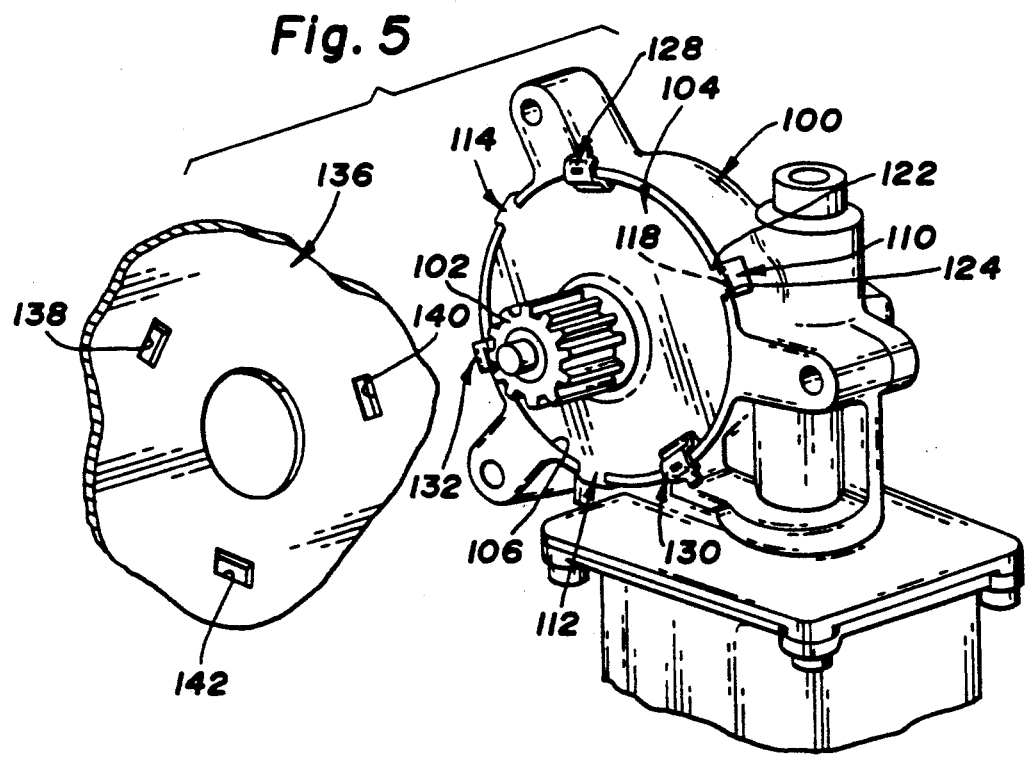
FIG. 5 is a view similar to FIG. 1 but showing a second embodiment of the invention.

As seen in FIG. 5, the door panel 136 has a plurality of openings 138, 140, and 142 which register with the tangs 128, 130, and 132 to permit insertion of the tangs through these apertures. As best seen in FIGS. 6, 7, and 8, the tang 128 is formed integrally with the cover 104 and projects radially therefrom. The tang 128 includes a retorsely bent spring leg 148 which carries a locking shoulder 150. As best seen in FIG. 7, the gear housing 100 is attached to the panel 136 by inserting the tang 128 through the aperture 138. Upon such insertion the locking shoulder 150 interacts with the panel 136 to spring the spring leg 148 away from the panel to admit the tang 128 to the position of FIG. 7 in which the spring leg 148 has been restored to its normal condition to retain the shoulder 150 in engagement with the panel 136. This engagement of the locking shoulder 150 with the panel 136 establishes a land portion 156 of the tang 128 in engagement with the panel 136 to thereby accurately and positively locate the housing 100 in relation to the panel 136. It will be understood that the tangs 130 and 132 are constructed identically to the tang 128 and cooperate therewith to securely attach the motor drive unit to the door panel 136.

It will be understood that the drive unit may be disassembled from the panel 136 by a forcibly flexing the tangs out of their respective engagement with the door panel to permit the tangs to be withdrawn from the apertures.

Thus it is seen that the invention provides a new and improved window regulator motor drive unit in which integral snap-tang attachments provided integrally on a cover of the motor drive unit obtain snap-fitting engagement into apertures of the door panel to eliminate the need for a plurality of independent fasteners for mounting the motor drive unit on the door panel.

The embodiments of the invention in which an exclusive property or privilege is claimed are defined as follows:

1. In a vehicle door having a window regulator carried by a panel and a motor drive unit with a drive gear projecting from an opening in a housing and adapted to drive the window regulator, the improvement comprising:

a cover for attachment on the housing to close the opening, said cover having a plurality of spaced apart first tangs engaging the housing to effect attachment of the cover on the housing, and said cover having a plurality of spaced apart second tangs projecting away from the housing;

and a plurality of openings in the panel registering with the plurality of second tangs and adapted to receive the second tangs in snap fitting engagement therewith whereby the motor drive unit is attached to the door.

2. The improvement of claim 1 further characterized by the housing being staked to the plurality of first tangs to attach the cover to the housing.

3. The improvement of the claim 1 further characterized by the first tangs having a snap fitting engagement with the housing to attach the cover to the housing.

4. The improvement of claim 1 further characterized by said second tangs extending through the openings in the panel and having a spring leg carrying a lock tab biased into engagement with the panel by the biasing of the spring leg.

5. The improvement of claim 1 further characterized by said openings having opposed walls and said second tangs extending through the openings in the panel and having a lock tab thereon engaging with one of the walls of the panel, and said second tangs having retrorsely bent spring legs engaging the other wall of the panel opening to urge the second tangs toward the one wall to maintain the lock tab in engagement with the panel.

* * * * *